Oct. 29, 1935.　　　　F. C. CLARK　　　　2,018,835
PROCESS AND APPARATUS FOR DISPENSING MEASURED QUANTITIES OF LIQUEFIED GAS
Filed Oct. 19, 1933
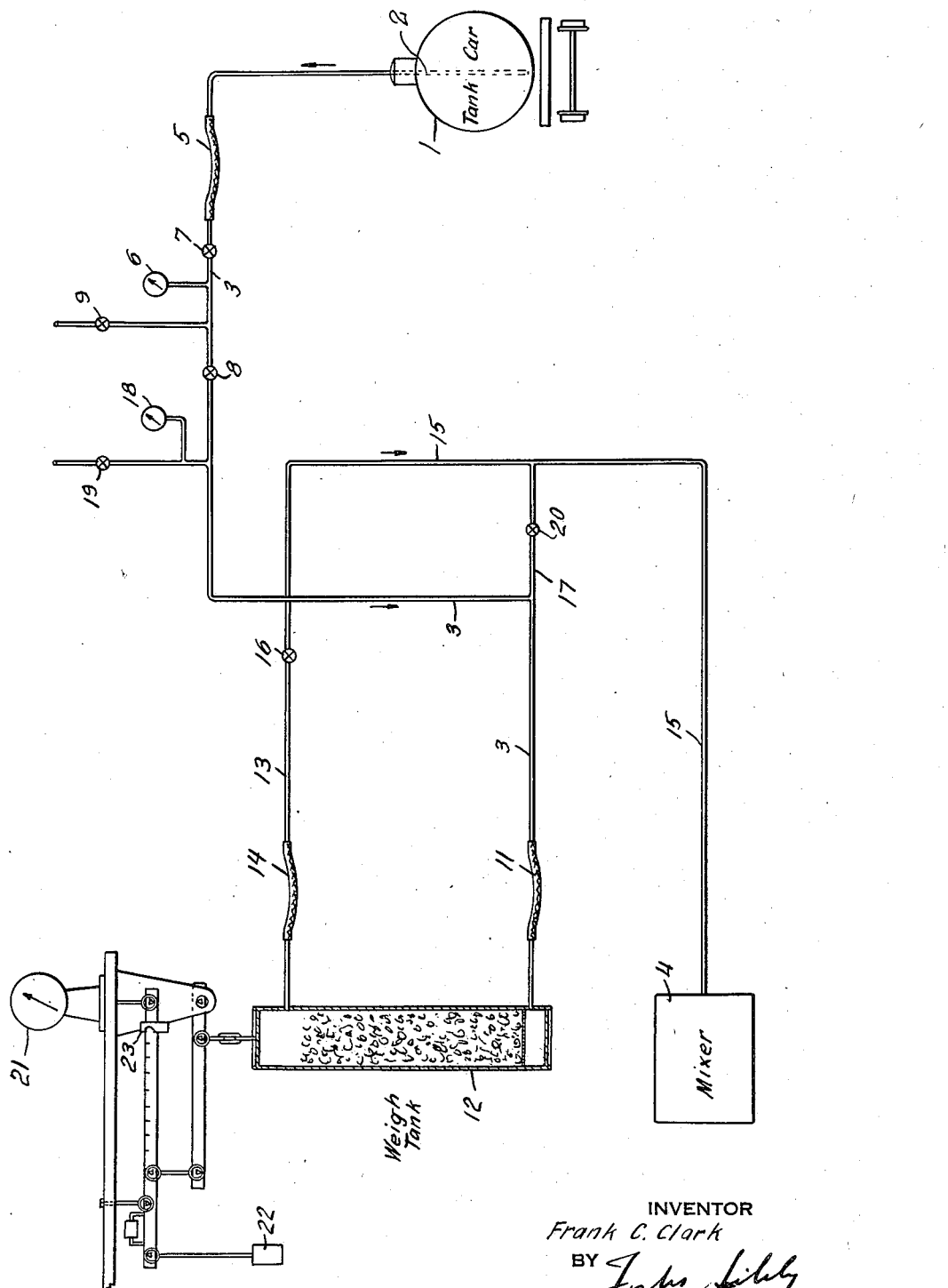
INVENTOR
Frank C. Clark
BY
ATTORNEY Patented Oct. 29, 1935

2,018,835

UNITED STATES PATENT OFFICE 2,018,835

PROCESS AND APPARATUS FOR DISPENSING MEASURED QUANTITIES OF LIQUEFIED GAS

Frank C. Clark, Floral Park, N. Y., assignor to Atmospheric Nitrogen Corporation, New York, N. Y., a corporation of New York Application October 19, 1933, Serial No. 694,263

7 Claims. (Cl. 62—1)

This invention relates to the dispensing of measured amounts of a liquefied gas maintained under super-atmospheric pressure, and more particularly, to the dispensing of measured amounts of liquid anhydrous ammonia from a tank car in which the gas is maintained at super-atmospheric pressure, into a mixer, such as a fertilizer mixer.

Liquid anhydrous ammonia is commonly stored and transported in commerce so that it reaches the consumer at a pressure of between 50 and 150 pounds per square inch gauge, the corresponding temperature being about 34° F. and 84° F., respectively. The temperature of the room in which the measuring apparatus is placed and the temperature of the measuring apparatus frequently rises to 100° F. or more, particularly during the summer months in the southern portion of the United States. The pressure exerted by anhydrous ammonia at 100° F. is about 197 pounds per square inch gauge. The problem, then is to cause ammonia to flow from a tank car in which the pressure is between 50 and 150 pounds per square inch gauge, into a measuring apparatus having a temperature such that a pressure of about 197 pounds per square inch gauge will be developed by the ammonia when it comes in contact with the walls of the measuring apparatus.

The usual practice in dispensing liquid ammonia from a tank car has included a measuring tank, and an ammonia compressor which has been employed to withdraw gas from the top of the measuring tank and discharge it into the top of the tank car, thus creating a pressure differential between the tank car or other storage tank and the measuring tank sufficient to cause the liquid ammonia to flow from the tank car into the measuring tank. In certain instances a compressor has been employed to force air or inert gas into the tank car, thus creating a pressure in the tank car higher than the pressure corresponding to the temperature in the measuring tank. These procedures are objectionable because of the relatively expensive equipment for their practice and the expense involved in the maintenance and operation of such equipment.

It is evident that a discharge of liquid ammonia from a tank car into a measuring tank could be effected by venting the measuring tank to the atmosphere, which would reduce the pressure in the measuring tank beneath the pressure in the tank car. The conditions here, however, are quite different from those obtaining with a relatively non-volatile fluid, such as water. Consider a tank car containing water at an air pressure of 50 to 150 pounds per square inch gauge in the interior of the tank car above the surface of the liquid. If it were desired to fill a closed measuring tank with water from this tank car, it would be necessary only to vent to the atmosphere that quantity of air which fills the measuring tank at atmospheric pressure.

Now, consider a tank car containing ammonia at a pressure of 50 pounds per square inch gauge and a corresponding temperature of 34° F. and assume that the pressure in the measuring tank must be 25 pounds per square inch gauge less than the pressure in the tank car in order to cause ammonia to flow through the connecting piping at rates desirable in commercial operation. In order to have the pressure in the measuring tank 25 pounds per square inch gauge, its temperature must be about 11° F. so that the ammonia in the measuring tank must be cooled about 23° F. by the evaporation of a portion of it, which requires the evaporation and venting of about 4.4 per cent of the ammonia flowing from the tank car into the measuring tank. With a tank car containing ammonia at 150 pounds per square inch gauge, about 2.2 per cent of the ammonia flowing into the measuring tank must be evaporated and vented in order to reduce the pressure in the measuring tank to 125 pounds per square inch gauge. It will be seen that venting to the atmosphere is not commercially feasible because of the loss of ammonia incident thereto. The provision of equipment for recovering the ammonia thus vented involves the objectionable expense of constructing, maintaining, and operating the recovery equipment.

Furthermore, the ammonia cannot be vented to the mixer without interfering with operation, since the operation of a fertilizer mixer is usually, if not always, a batch operation, and it is necessary to synchronize the introduction of ammonia with a certain step of the mixing procedure. For example, in the ammoniation of superphosphate or superphosphate mixtures, it is the practice to spray the ammonia over the superphosphate material immediately after it has entered the mixer. Accordingly, if it is attempted to vent the measuring tank to the mixer, the measuring tank can be filled only after the introduction of superphosphate into the mixer, at which time the mixer is ready to receive the full charge of ammonia. This causes a delay in operation.

It is an object of this invention to provide a process and apparatus for dispensing measured quantities of a liquefied gas, such as ammonia, from a tank car or other main bulk thereof under superatmospheric pressure into a mixer, such as a fertilizer mixer, the dispensing of the ammonia in normal operation being independent of the mixer and being accomplished without the use of pumps or compressors, and this by relatively simple apparatus which is comparatively inexpensive to install and operate. Other objects and advantages of this invention will be apparent from the following detailed description.

In accordance with this invention, a measuring tank is provided which contains suitable packing, such as cast iron or steel in the form of small castings, rivets, bolts, or nuts. In normal operation, liquid ammonia introduced into this measuring vessel is discharged therefrom into the mixer and during the latter portion of the discharge, the ammonia adhering to the packing and to the walls of the vessel evaporates, cooling the packing and the measuring vessel to a temperature below the temperature of the liquid ammonia in the tank car. During a succeeding cycle, when a desired charge is introduced into the measuring vessel, the packing lowers the temperature of the incoming liquid ammonia, reducing its vapor pressure beneath that of the vapor pressure of the ammonia in the tank car, thus creating a pressure differential which permits the flow of the desired charge of liquid ammonia from the tank car into the measuring vessel.

In the preferred embodiment illustrated on the drawing, the invention is shown incorporated in liquid ammonia dispensing equipment and the present description will be confined to the illustrated embodiment of the invention. It will be understood, however, that the novel features and improvements are susceptible to other applications; for example, to the dispensing of measured amounts of other liquids having high vapor pressure, such as aqua ammonia. Hence, the scope of this invention is not confined to the embodiment herein described.

In the drawing, the single figure is a side elevation of apparatus for practicing this invention.

Referring to the drawing, reference numeral 1 designates a tank car of usual construction for transporting anhydrous ammonia. This tank car is provided with a dip pipe 2. Pipe 3 leads from the dip pipe 2 to the apparatus hereinafter described for delivering measured amounts of ammonia to a mixer 4. One end of pipe 3 may be connected with a dip pipe 2 by flexible connection 5 and this pipe 3 may be provided with pressure gauges 6 and 18, valves 7 and 8, and relief valves 9 and 19. The other end of pipe 3 is connected by means of a flexible connection 11 with the base of the measuring vessel 12. A pipe 13 connected by the flexible connection 14 with the top of the measuring vessel 12 leads into a line 15 which communicates with the mixer 4. Valve 16 controls flow from the measuring vessel through line 13. Line 17, equipped with valve 20, is communicably connected with the pipe lines 3 and 15.

The measuring vessel 12 is provided with suitable packing 12' preferably made of material inert with respect to the ammonia. The walls of the vessel may be mild steel. The packing may be made up of cast iron or steel in the form of small castings, rivets, bolts, nuts, or nipples. Operating with a measuring vessel designed to deliver a charge of 100 pounds of liquid ammonia to the mixer, from 75 to 250 pounds of packing material may be employed. The size and shape of the packing may be determined with regard to the ratio of surface to weight of the packing material, and the number of points of contact at which drops of ammonia will be held by capillary attraction for evaporation at the end of the discharge of ammonia from the weighing or measuring vessel into the mixer.

Vessel 12 is shown on the drawing suspended from a suitable weighing scale which may be of any well-known type. One form of scale for weighing the charge is indicated on the drawing. This scale involves a dial 21 for indicating the weight of the charge introduced into vessel 12, a counterweight 22 for counter-balancing the weight of the bottle or tank 12 and the packing material, and a sliding weight 23.

In starting up the apparatus, valve 20 is closed and valves 7, 8, and 16 are opened allowing liquid ammonia to flow under its vapor pressure from tank car 1 into tank 12 which is vented through lines 13 and 15 into the mixer 4. When the desired charge of ammonia has been introduced into the vessel 12, as shown by the dial 21 of the scale, valves 8 and 16 are closed and valve 20 opened allowing the liquid ammonia to flow through lines 3, 17 and 15 into the mixer 4. After the discharge of liquid ammonia, it will be noted that the vessel 12 is vented through lines 3, 17 and 15 to the mixer 4 which is at atmospheric pressure. Residual ammonia adhering to the packing and walls of the vessel is evaporated with consequent chilling of the packing and vessel. With a vessel designed to have a capacity to deliver a charge of 100 pounds of ammonia and containing a packing charge of 75 pounds, the temperature of the packing in operation will be lowered as much as 50° F. beneath the temperature of liquid ammonia in the tank car.

In normal operation, i. e., once the packing is cooled to a temperature substantially beneath that of the liquid ammonia in the tank car, it is not necessary to vent the weigh tank or vessel 12 to the mixer 4 during the filling of this vessel. It is only necessary to open valve 8 until the desired quantity of liquid ammonia as indicated by the scale 21 is admitted to the weigh tank 12 after which valve 8 is closed. It will be noted that liquid ammonia enters through the combined inlet and outlet at the base of the measuring vessel 12 and that the level of liquid in this vessel gradually rises until the desired charge, as indicated by the scale 21, has been introduced, at which point the packing in the vessel is preferably completely immersed in liquid ammonia. When it is desired to dispense the charge into the mixer 4, valve 20 is opened, the liquid ammonia flowing from the tank 12 through lines 3, 17 and 15 into mixer 4, residual ammonia adhering to the packing and the walls of the vessel being evaporated, thus cooling the packing and the vessel.

Thermal insulation may be provided about the tank 12 and the pipes through which ammonia flows.

It will be noted that in accordance with this invention the discharge of measured quantities of liquid ammonia or other liquefied gas under superatmospheric pressure is accomplished without use of compressors or pumps and by means of equipment which is comparatively inexpensive to construct and simple to maintain and operate. After operation of the apparatus has commenced, i. e., during normal operation, the operation of the measuring tank is entirely independent of the fertilizer mixer and this without loss of ammonia or the employment of storage equipment for collecting ammonia vented to permit flow of ammonia from the tank car to the measuring device.

Since certain changes in carrying out the above process and the construction set forth which embody the invention may be made without departing from its scope, it is intended that all matter contained in the above description or shown in the accompanying drawing shall be interpreted as illustrative and not in a limiting sense.

I claim:

1. The process of dispensing measured quantities of liquefied ammonia from a main bulk thereof which comprises introducing a charge of liquid ammonia into a measuring vessel containing loose packing which has been cooled by the evaporation of a portion of the liquid ammonia during the preceding charging cycle, the capacity of the packing for transfer of heat between the ammonia and the packing being such that the charge introduced is cooled to a temperature materially beneath that of the main bulk thereof.

2. The process of dispensing into a mixer measured quantities of liquid ammonia from a main bulk of liquid ammonia under superatmospheric pressure involving the use of a measuring vessel having loose packing therein which comprises introducing a measured quantity of liquid ammonia into said measuring vessel, discharging a measured quantity of liquid ammonia from the measuring vessel into the mixer while evaporating a portion of the liquid ammonia, thereby cooling the packing to a temperature beneath that of the liquid ammonia constituting the main bulk thereof, the capacity of the packing for transfer of heat between the ammonia and the packing being such that the cooled packing creates a substantial pressure differential between the liquid ammonia of the main bulk and the liquid ammonia cooled upon contact with the packing in the vessel, and utilizing the pressure differential thus created to cause the flow of liquid ammonia from the main bulk into the measuring vessel.

3. The process of dispensing into a mixer measured quantities of liquid ammonia from a main bulk of liquid ammonia under superatmospheric pressure, involving the use of a measuring vessel having loose packing therein and a combined inlet and outlet at the base thereof, which comprises passing liquid ammonia through the combined inlet and outlet into the measuring vessel until the packing in said vessel is completely immersed in the liquid ammonia and a desired charge has been introduced, discharging the measured quantity of liquid ammonia through the combined inlet and outlet into the mixer, residual ammonia adhering to the packing being evaporated at the end of the discharge cycle whereby the packing is cooled to a temperature beneath that of the liquid ammonia constituting the main bulk thereof, the surface area and capacity of the packing for transferring heat between the ammonia and the packing being such that the cooled packing creates a substantial difference in pressure between the vapor pressure of the ammonia of said main bulk and that of the ammonia cooled by said packing, and utilizing the pressure differential thus created between that of the liquid ammonia of the main bulk and the liquid ammonia cooled upon contact with the packing in the vessel during the passage of a subsequent charge thereinto to cause the flow of liquid ammonia constituting said subsequent charge from the main bulk into the measuring vessel.

4. Apparatus for dispensing into a mixer measured quantities of liquid ammonia from a tank in which the ammonia is maintained at superatmospheric pressure, which comprises a weighing scale, a measuring vessel suspended from said weighing scale containing loose packing having a relatively large surface area, said measuring vessel communicating with said tank, and a mixer communicating with said measuring vessel.

5. The process of dispensing measured quantities of liquefied gas from a main bulk thereof which comprises introducing a charge of liquefied gas into a measuring vessel containing packing, discharging said charge from the vessel and introducing another charge of liquefied gas into the vessel, the temperature of each charge introduced into said vessel being lowered materially beneath the temperature of said main bulk by contact with the packing which has been cooled by the evaporation therefrom of the residual liquefied gas of a preceding charge.

6. The process of dispensing quantities of ammonia from a main bulk of liquid ammonia under superatmospheric pressure which comprises introducing a quantity of liquid ammonia from the main bulk into a vessel containing packing, discharging the major portion of said liquid ammonia from said vessel, the residual ammonia adhering to the packing being evaporated, and introducing another charge of liquid ammonia from said main bulk into the vessel, the surface area of the packing being such that the evaporation of the residual ammonia adhering thereto will cool the packing sufficiently to materially lower the temperature of the ammonia subsequently introduced into the vessel from the main bulk.

7. Apparatus for dispensing measured quantities of liquefied gas from a tank in which the liquefied gas is maintained at superatmospheric pressure, which comprises a measuring vessel communicating with said main bulk of liquefied gas and provided with a discharge outlet, said vessel having loose packing therein of surface area and capacity for transfer of heat between the liquefied gas and the packing such that the temperature of the liquefied gas introduced into said vessel from said main bulk is materially lowered by contact with the packing which has been cooled by evaporation of the residual portion of a preceding charge of liquefied gas.

FRANK C. CLARK.